United States Patent [19]
Kieffaber

[11] 3,947,597
[45] Mar. 30, 1976

[54] METHOD OF MAKING A UNIFORM DOUGH MIXTURE CONTAINING SCRAP DOUGH

[75] Inventor: Clarence A. Kieffaber, Overland Park, Kans.

[73] Assignee: Marion Corporation, Kansas City, Kans.

[22] Filed: Oct. 10, 1974

[21] Appl. No.: 513,652

[52] U.S. Cl. .................................. 426/27; 426/504
[51] Int. Cl.² ............................................ A21D 8/00
[58] Field of Search .......... 426/343, 345, 346, 496, 426/502, 503, 19, 27

[56] References Cited
UNITED STATES PATENTS

| | | | |
|---|---|---|---|
| 2,888,888 | 6/1959 | Jorgenson et al. | 426/297 |
| 3,311,069 | 3/1967 | Underwood | 426/502 |
| 3,694,227 | 9/1972 | Vezzani | 426/343 X |

*Primary Examiner*—Raymond N. Jones
*Attorney, Agent, or Firm*—Alfred R. Fuchs

[57] ABSTRACT

Scrap dough having connected areas and resulting from cutting spaced dough shapes from a continuous sheet of dough is continuously returned to the mixer after additional new dough ingredients are added to the mixer and before full development of the new dough. The scrap dough is continuously mixed with the new dough until full development of the new dough occurs.

4 Claims, 3 Drawing Figures

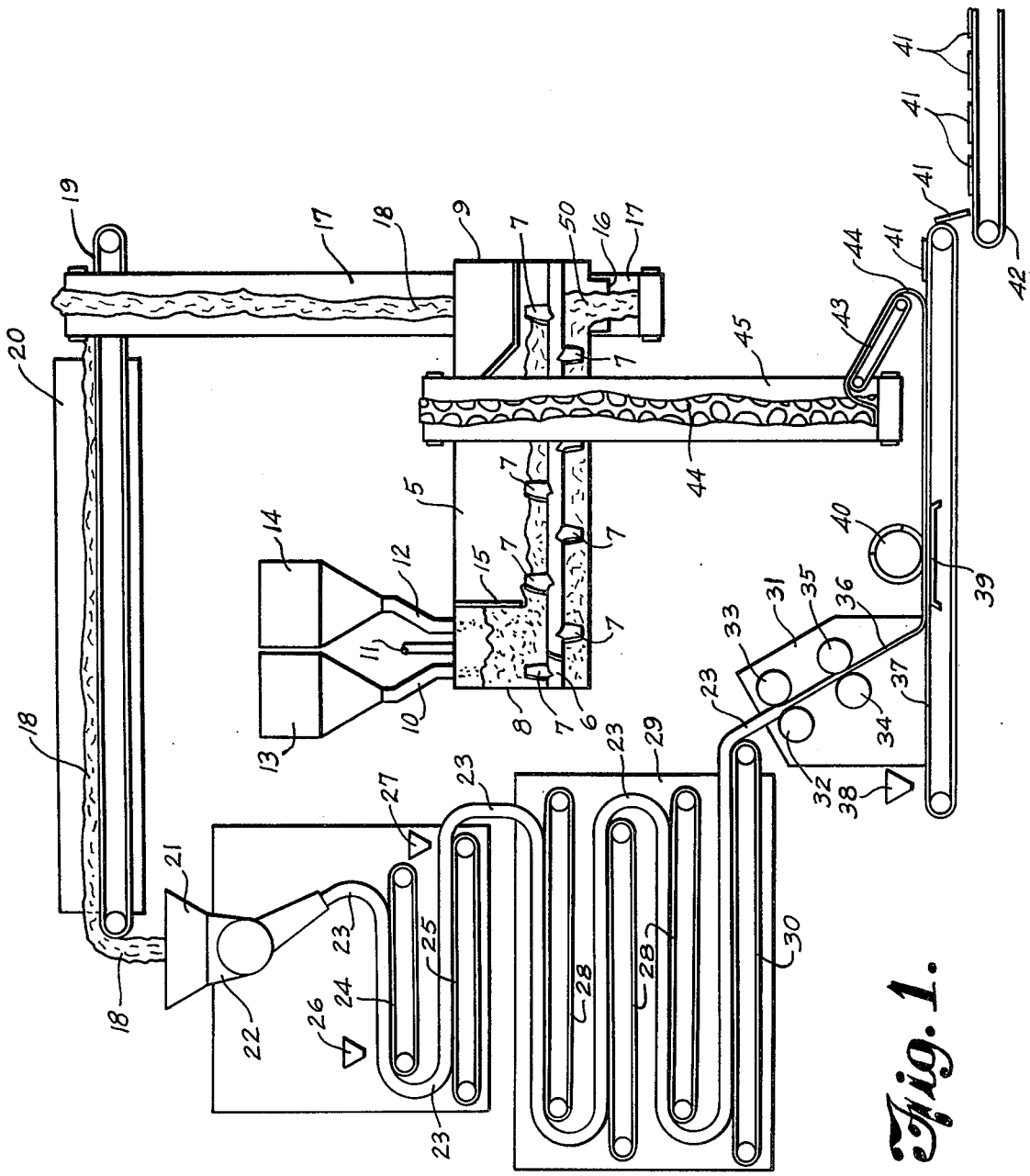

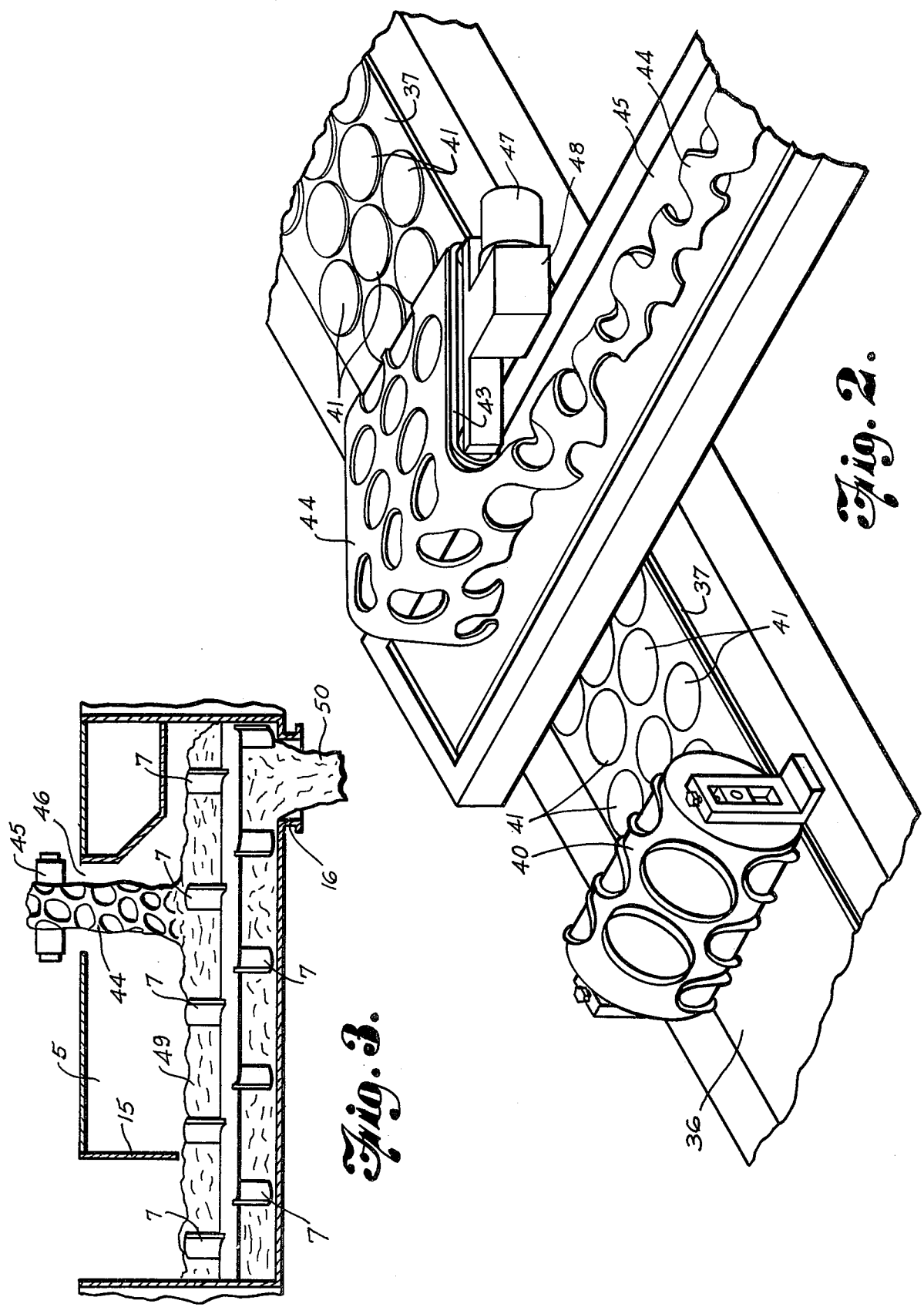

METHOD OF MAKING A UNIFORM DOUGH MIXTURE CONTAINING SCRAP DOUGH

There have been machines for making cookies and other dough products not made of yeast leavened dough in which the scrap resulting after the cookies or other similar products have been cut from the dough, is fed back to the hopper from which the dough is fed to the cutting mechanism. In machines for making cookies and such other products in which a mixer is provided, in combination with the cutting mechanism, the scrap is fed back to the hopper that supplies the dough to the cookie making machine, but there is no means provided for mixing the scrap dough with the dough that is supplied to the hopper. Also, in the making of such products as macaroni, spaghetti, etc., in which the products produced are extruded by the machine, some waste is returned to a duct that feeds it to a centrifugal separator and from that it passes into a mixer. The scrap material, however, is not from a yeast leavened dough that has been sheeted.

It has been the practice to collect the scrap from cutting dough shapes from a sheet of yeast leavened dough, to accumulate a quantity of the scrap in a suitable container and periodically dump the accumulated scrap into a continuous mixer in which the ingredients of the dough, from which the dough shapes are to be cut, are mixed into a uniform mass and the mass developed into a dough. This results in the dough discharged from the mixer being variable in character as it leaves the same both as to the amount of fermentation and the wetness thereof. This makes it difficult to produce a uniform product from doughs produced by a continuous mixer that have had a relatively large amount of scrap added thereto in the mixer periodically.

It is the purpose of my invention to incorporate the scrap from a dough sheet that has had dough shapes cut therefrom into a new dough mixture in such a way that the resulting product of the mixing of the new dough and the scrap dough will be uniform in character as to the quantity of scrap therein as it leaves the continuous mixer. This is highly desirable in order to produce a uniform product from the doughs that are supplied to the cutting mechanism, when the dough shapes that have been cut from the dough are processed to produce a food product in which said dough shapes are incorporated.

By continuously returning the scrap left from cutting dough pieces out of a sheeted band of leavened dough, as the scrap is formed, to the continuous mixer in which the dough ingredients are mixed and developed into a newly mixed dough, in such a manner that the scrap dough is introduced to the mass being mixed continuously with the new dough that is being developed by the mixer, a uniform amount of the scrap material will be continuously introduced into the new dough during the mixing operation thereof to produce a uniform mixture of the added scrap and the new dough and the resultant dough mixture discharged from the continuous mixer will be uniform and capable of producing uniform products from the dough shapes cut therefrom.

Other objects and advantages of my invention will appear as the description of the drawings proceeds. I desire to have it understood, however, that I do not intend to limit myself to the particular details shown or described except as defined in the claims.

In the drawings:

FIG. 1 is a diagrammatic view partly in elevation and partly in plan showing the arrangement of apparatus provided for making the dough shapes and for carrying out my method of producing the dough mixture containing the scrap dough produced by the apparatus.

FIG. 2 is a detail perspective view showing the means for transferring the scrap dough from the cutting table conveyer to a return conveyer extending to the continuous mixer and, FIG. 3 is a longitudinal sectional diagrammatic view through the mixer showing a fragmentary portion of the discharge end of the scrap dough return conveyer.

Referring in detail to the drawings, in FIG. 1 a continuous mixer 5 is whown which is provided with suitable mixing mechanism comprising a plurality of shafts 6 with paddles 7 thereon that are so arranged as to convey the contents of the mixer from adjacent the entrance end 8 thereof to adjacent the exit end 9 thereof. The dough ingredients are supplied to the continuous mixer 5 adjacent the entrance end 8 thereof through suitable conduits 10, 11 and 12, the conduit 10 extending from a suitable flour container 13 to which flour is supplied so as to keep a predetermined minimum amount therein, the details of the means for providing for a controlled supply of flour not being shown. Water and other liquid ingredients of the dough are supplied in a controlled manner through a conduit 11 emptying into the mixer 5 near the entrance end 8 thereof and other dry ingredients of the dough mixture, including yeast, are supplied to the dough mixer near the entrance end 8 thereof through conduit 12 from a container 14, which is supplied with a suitable mixture thereof, in a controlled suitable manner. A partition or baffle 15 may be provided in the body portion of the mixer 5 to prevent any of the ingredients from passing into the portion of the mixer body to the right of said partition until after the ingredients have been engaged by at least one or more of the paddles 7.

The agitating means comprising the paddles 7 not only moves the mixer contents toward the exit end 9 of the body portion of the mixer 5, but also first incorporates the wet and dry ingredients into a mass in which the ingredients are uniformly mixed and then as the contents of the mixer pass toward the exit end 9 thereof, exert pulling forces on the mass of dough to fully develop the dough. A discharge outlet 16 is provided in the underside of the mixer 5 from which the developed dough passes onto a belt conveyer 17. A stream of developed dough 18 thus is provided on the conveyer belt 17.

The conveyer belt 17 discharges onto a conveyer belt 19 which passes through a chamber 20 in which the temperature and humidity are suitably controlled so as to be favorable to the fermentation of the dough 18 passing through the same on the belt. The stream of dough 18, after having been fermented in the chamber 20, passes into the hopper 21 of an extruder 22 which is similar to that shown in the patent to Jorgensen et al. U.S. Pat. No. 2,888,886, having a dough pump incorporated therein, such as shown in said patent, to discharge a uniform stream 23 of extruded dough in the form of a flat faced strip therefrom which passes over at least a pair of conveyer belts 24 and 25, which are provided with flour dusters 26 and 27, to apply a coating of dusting flour to both faces of said strip 23. The floured strip 23 then passes into a proofer 29 in which it passes over a plurality of conveyer belts 28 successively so as to provide the desired time period during which said extruded dough strip is subjected to fermentation. A discharge belt 30 conveys the dough strip 23 from the proofer to a sheeting mechanism, which is provided with sheeting rollers, such as shown in the patent to Sticelber U.S. Pat. No. 2,699,737, that have an inner load sustaining metallic core and a sleeve of teflon surrounding the core. The sheeting mechanism is shown diagrammatically at 31, being provided with pairs of sheeting rollers 32 and 33, and 34 and 35. The sheeting mechanism discharges the stream of dough, in the form of an imperforate band 36, which is of uniform width and thickness, onto the conveyer belt 37 to which a coating of dusting flour is supplied by the flour duster 38. The conveyer belt 37 operates over a suitable cutting table 39, with which a cutting roll 40 cooperates to cut the dough shapes 41 out of the imperforate sheet 36. One of the cut dough pieces 41 is shown in FIG. 1 at the right end of the conveyer 37 on the same and another such cut dough shape 41 is shown as passing off the conveyer belt 37 onto a conveyer belt 42 which conveys the cut dough pieces or shapes 41 to other mechanism where the other ingredients of the food product in which the dough shapes are used are added to the dough shapes 41 for producing the product in which the dough shapes are used. A transfer conveyer 43 extends upwardly at an angle from the conveyer belt 37 and is independently driven so as to operate at a higher rate of travel than the conveyer belt 37.

In carrying out my method the continuous length 44 of dough scrap remaining after the dough shapes 41 have been cut therefrom is manually directed onto the transfer conveyer 43. The dough, due to the processing thereof up to where the shapes 41 are cut therefrom, is of such a character that the dough has sufficient strength that after being started on the transfer conveyer 43, the connected areas of scrap dough that remain between the dough shapes cut out of the same will not separate but will continue to remain connected together as the scrap is transferred onto the transfer conveyer belt 43 and is carried by it to a conveyer belt 45. The conveyer belt carries the stream of connected scrap back to the mixer 5, which is provided with an opening 46 in the top thereof, below the discharge end of the conveyer belt 45 so that a continuous stream of dough scrap carried by the conveyer belt 45 will be continuously discharged at a uniform rate into the body of the mixer 5 in spaced relation from the discharge end thereof, so that the stream of dough scrap will be uniformly and thoroughly mixed with the mixing dough ingredients before the dough being mixed in the continuous mixer 5 is completely developed.

The conveyer belt 43 is driven by a motor 47 through a suitable speed controlling device 48 at a lineal speed slightly greater than the lineal speed of the conveyer belt 37 so that the conveyer belt 43 exerts a slight pulling action on the band of scrap dough 44 to continuously pull it off the belt 37 after it has been started on the belt 43 manually, (See FIG. 2). The continuous stream of scrap dough 44 will thus be continuously fed into the mass of new dough 49 in the mixer 5 while it is being mixed (See FIG. 3), the scrap dough 44 being uniformly mixed with the new dough 49 before the uniform mixture 50 is discharged through the outlet 16.

While dough disks circular in shape are shown in the drawings which would be of the character used in making such products as pizzas and tortillas, the method is usable for incorporating scrap dough from which dough shapes of other shapes and sizes than shown have been cut, such as the scrap resulting from cutting out suitable dough shapes for making pretzels, frozen pies, biscuits, English muffins, doughnuts, and what bakers refer to as "sweet goods". The size and number of dough shapes shown in the drawings as cut out of the dough band 36 in FIG. 2 is not the size and number cut from any dough band for any particular product, but is merely illustrative of any dough shape, the cutting of which from a band of sheeted dough produces a continuous connected stream of scrap.

What I claim is:

1. The method of continuously making a uniform dough mixture, containing scrap sheeted leavened dough in a continuous dough mixer comprising continously mixing into a new dough the dough ingredients required for said new dough and feeding a continuous length of connected areas of said scrap dough in a substantially uniform stream into the mass of mixing new dough ingredients in said mixer prior to completion of development of said new dough, and continuing the mixing of said scrap dough with said new dough ingredients to the full development of said new dough.

2. The method claimed in claim 1 in which the connected areas of scrap dough are produced by cutting spaced dough shapes from a continuous imperforate band of said sheeted leavened dough.

3. The method claimed in claim 1 in which the scrap dough is yeast leavened.

4. The method claimed in claim 2 in which the scrap dough is yeast leavened.

* * * * *